United States Patent [19]
Cipolla et al.

[11] Patent Number: 5,608,274
[45] Date of Patent: Mar. 4, 1997

[54] SAFETY SWITCH SYSTEM WITH WORKPIECE POSITIONING MECHANISM

[75] Inventors: David Cipolla, Harrisburg; Ronald D. Peffer, York Haven, both of Pa.

[73] Assignee: The Whitaker Corporation, Wilmington, Del.

[21] Appl. No.: 391,391

[22] Filed: Feb. 27, 1995

[51] Int. Cl.⁶ .................... H01H 35/00; H02B 1/24
[52] U.S. Cl. .................... 307/119; 83/13; 227/4
[58] Field of Search .................... 227/7, 6; 307/326, 307/119

[56] References Cited

U.S. PATENT DOCUMENTS

| | | | |
|---|---|---|---|
| 3,837,063 | 9/1974 | Wright | 29/203 P |
| 3,932,931 | 1/1976 | Wright | 29/626 |
| 3,938,245 | 2/1976 | Lovendusky et al. | 29/626 |
| 4,166,316 | 9/1979 | Misawa et al. | 29/626 |
| 4,315,365 | 2/1982 | Wigby | 29/739 |
| 4,463,636 | 8/1984 | Heller et al. | 83/13 |
| 4,612,699 | 9/1986 | Lovendusky et al. | 29/739 |
| 4,889,272 | 12/1989 | Kunreuther | 227/4 |
| 4,914,811 | 4/1990 | Nolte, Jr. | 29/747 |
| 5,199,338 | 4/1993 | Schorn et al. | 83/13 |
| 5,241,744 | 9/1993 | Legrady et al. | 29/845 |

Primary Examiner—William M. Shoop, Jr.
Assistant Examiner—Kim Lockett
Attorney, Agent, or Firm—Robert J. Kapalka

[57] ABSTRACT

A safety switch system for a machine having a ram which can be cycled toward and away from a workstation includes a pair of trip switch triggers disposed on handgrips remote from the workstation and an anvil switch trigger coupled to the machine at the workstation. The trip switch triggers are operable to effect a first signal, and the anvil switch trigger is operable to effect a second signal. The handgrips are coupled to a workpiece holder which is movable to align a selected area of a workpiece in the tooling ram path and to move the workpiece into actuating engagement with the anvil switch trigger. A control system is provided for cycling the ram upon sensing the first and second signals.

10 Claims, 6 Drawing Sheets

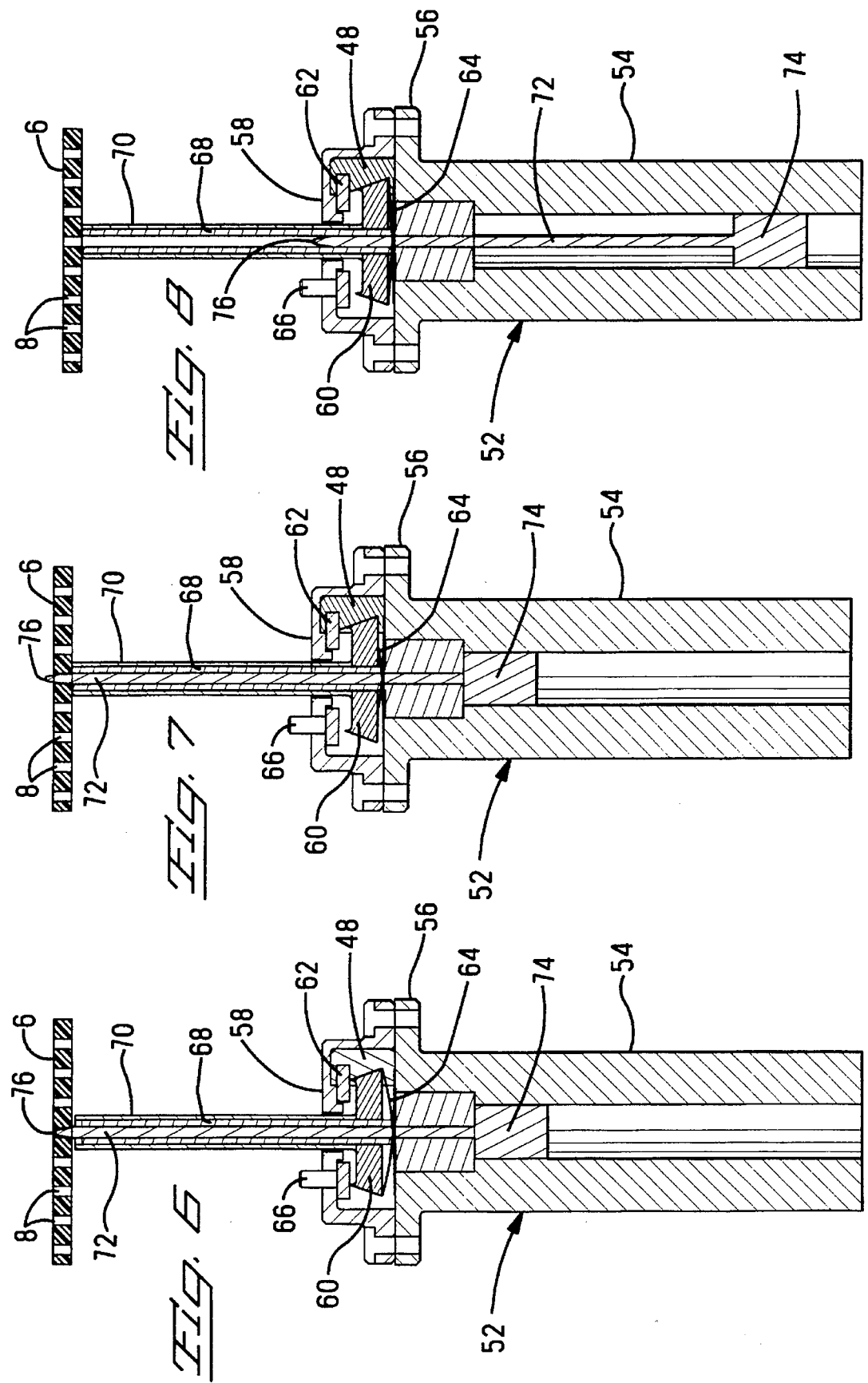

SAFETY SWITCH SYSTEM WITH WORKPIECE POSITIONING MECHANISM

FIELD OF THE INVENTION

The invention relates to a safety switch system for initiating a machine cycle, and more particularly, to a safety switch system which includes hand switches disposed remote from a work zone of a machine which are coupled with a mechanism for positioning a workpiece in the work zone.

BACKGROUND OF THE INVENTION

In various machines which are cycled when an operator triggers an activation device, it is common to employ a safety switch system which prevents accidental injury by requiring that an operator's hands be clear of moving parts of the machine before the machine can be cycled. A common safety switch system includes two hand-operated switches which are spaced apart within reach of the operator but clear of the moving parts. Both switches must be depressed simultaneously in order to cycle the machine. Since it is virtually impossible to activate both switches simultaneously without using both hands, the system is very effective in preventing injury. However, a machine operator often must perform chores on, or in the area of, the workpiece during intervals between work cycles of the machine, and thus the operator's hands must move back and forth between the safety switches and the workpiece, thereby consuming valuable production time. In some cases the operator merely needs to reposition the workpiece between machine cycles. When many machine cycles are required to finish a workpiece and the workpiece must be repositioned after every cycle, a large proportion of the total production time is spent in movement of the operator's hands back and forth between the safety switches and the workpiece, and in repositioning the workpiece. What is needed is a safety switch system which enables an operator to reposition a workpiece between machine cycles without removing his or her hands from the safety switches.

SUMMARY OF THE INVENTION

The invention provides a safety switch system for a machine which has a tooling ram movable along a tooling ram path toward and away from a work station, and a means for driving the tooling ram along the tooling ram path. The safety switch system comprises a trip switch means including a pair of trip switch triggers disposed remote from the workstation wherein the trip switch means is operable for effecting a first signal upon simultaneous actuation of the trip switch triggers, and an anvil switch means including an anvil switch trigger disposed at the workstation wherein the anvil switch means is operable for effecting a second signal upon actuation of the anvil switch trigger. A workpiece holder is mounted for movement in a first direction which is non-parallel with the tooling ram path whereby a target area of the workpiece can be aligned in the tooling ram path in a vicinity of the workstation, and in a second direction parallel to the tooling ram path whereby the workpiece can be urged into actuating engagement with the anvil switch trigger. A means for moving the holder in the first and second directions enables a selected area of the workpiece to be aligned in the tooling ram path and to be urged into actuating engagement with the anvil switch trigger. A control means is provided for actuating the means for driving upon sensing the first and second signals.

BRIEF DESCRIPTION OF THE DRAWINGS

The invention will now be described by way of example with reference to the accompanying drawings in which like elements in different figures thereof are identified by the same reference numeral and wherein:

FIGS. 6–8 are cross-sectional views of the anvil tooling switch in different stages of operation.

DETAILED DESCRIPTION OF THE PREFERRED EMBODIMENT

Figure 1:
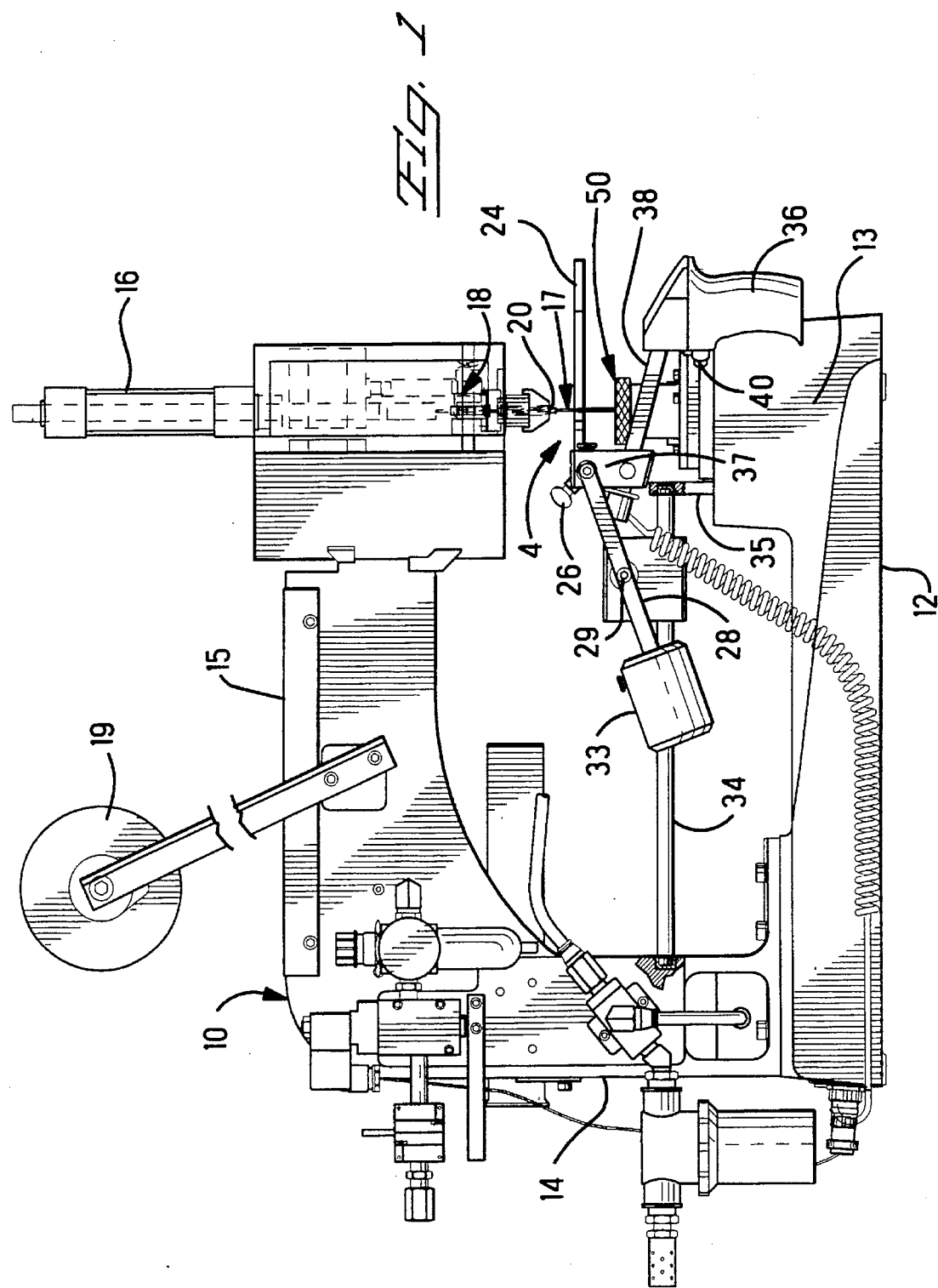
FIG. 1 is a side view of a terminal insertion machine having a safety switch system and workpiece positioning mechanism according to the invention.
Figure 2:
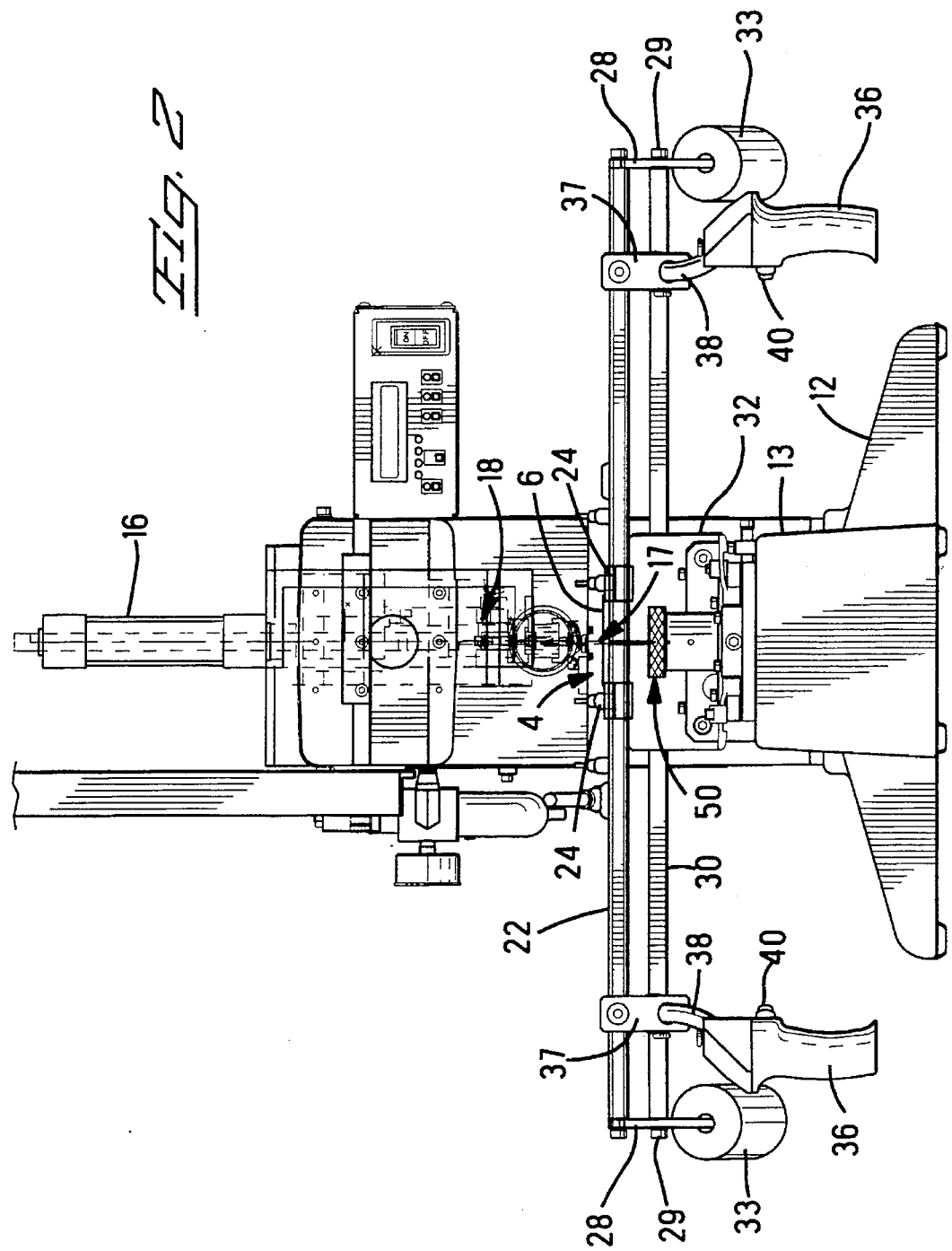
FIG. 2 is a front view of the machine.

With reference to FIGS. 1 and 2, a terminal insertion machine includes a frame 10, commonly referred to as an L-arm, having a base 12, a tooling support 13, a riser 14, and an extension 15. A lower tooling assembly 50 is mounted on the tooling support 13, thereby defining a workstation 4. Coupled to the extension 15 is a ram package which includes a drive means such as actuation cylinder 16, in this case a pneumatic cylinder, and a tooling ram 17 (shown in down position in FIG. 1) which is guided for movement along a tooling ram path toward and away from the workstation 4. Coupled to the tooling ram 17 is an inserter 20 which is specially adapted for installing terminals of a particular size and shape into a circuit board 6, although the inserter 20 could be replaced by other tools which are adapted for performing an operation on a workpiece. Also coupled to the extension 15 is a terminal feed station 18 which receives terminals in strip form from a supply spool 19. Upon actuation of the insertion machine, the cylinder 16 drives the tooling ram 17 downwardly, thereby driving the inserter 20 through the feed station 18 where an individual terminal is separated from the strip and is carried to the workstation 4 for insertion in the circuit board 6.

Figure 3:
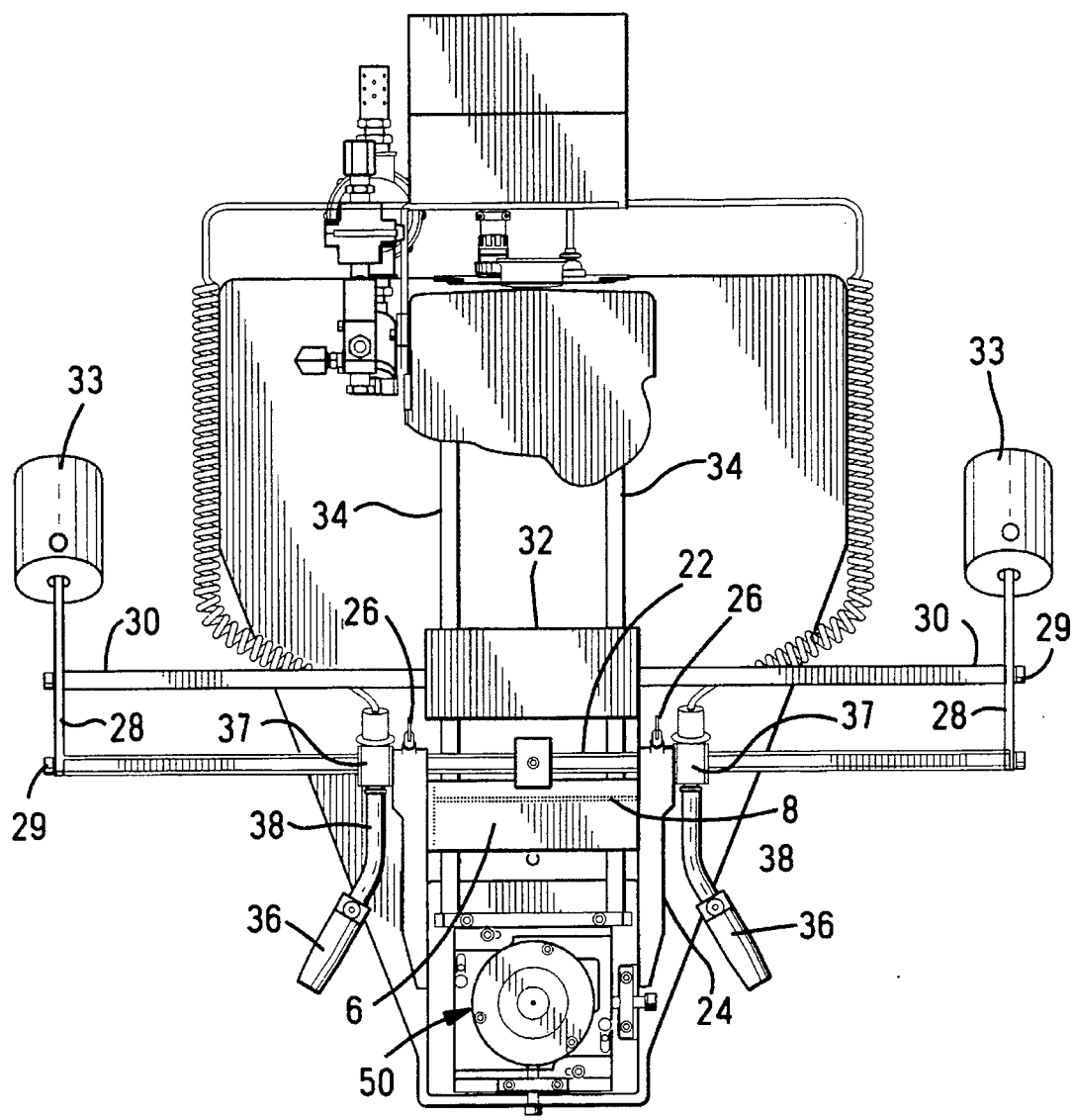
FIG. 3 is a top view of the machine.

Referring now also to FIG. 3, the circuit board 6 has an array of apertures 8 which receive individual ones of the terminals. The terminal insertion machine has a mechanism which allows selective positioning of the circuit board so that individual apertures can be successively positioned in the path of the inserter for insertion of a terminal in each of the apertures. The mechanism includes a circuit board holder comprising a board support bar 22 and a pair of clamp bars 24 which are slidably adjustable on the support bar 22 for adjusting a space between the clamp bars 24. Each of the clamp bars 24 has a groove which can receive an edge of the circuit board 6. Set screws 26 enable the clamp bars 24 to be fixed in position on the support bar 22. The support bar 22 is coupled at its ends by coupling bars 28 to a transverse shaft 30 which rides in and is carried by a bearing block 32. The coupling bars 28 are fixed to the transverse shaft 30 by fasteners 29, and the transverse shaft 30 is rotatably and slidably sufforted within the bearing block 32. Counterweights 33 on ends of the coupling bars 28 are rotatably adjustable to counterbalance the circuit board holder so that a circuit board held therein is in a substantially floating arrangement. The bearing block 32 rides on a pair of longitudinal shafts 34 which are mounted at one end in the machine frame riser 14 and at the other end in a plate 35 mounted on the tooling support 13.

Figure 4:
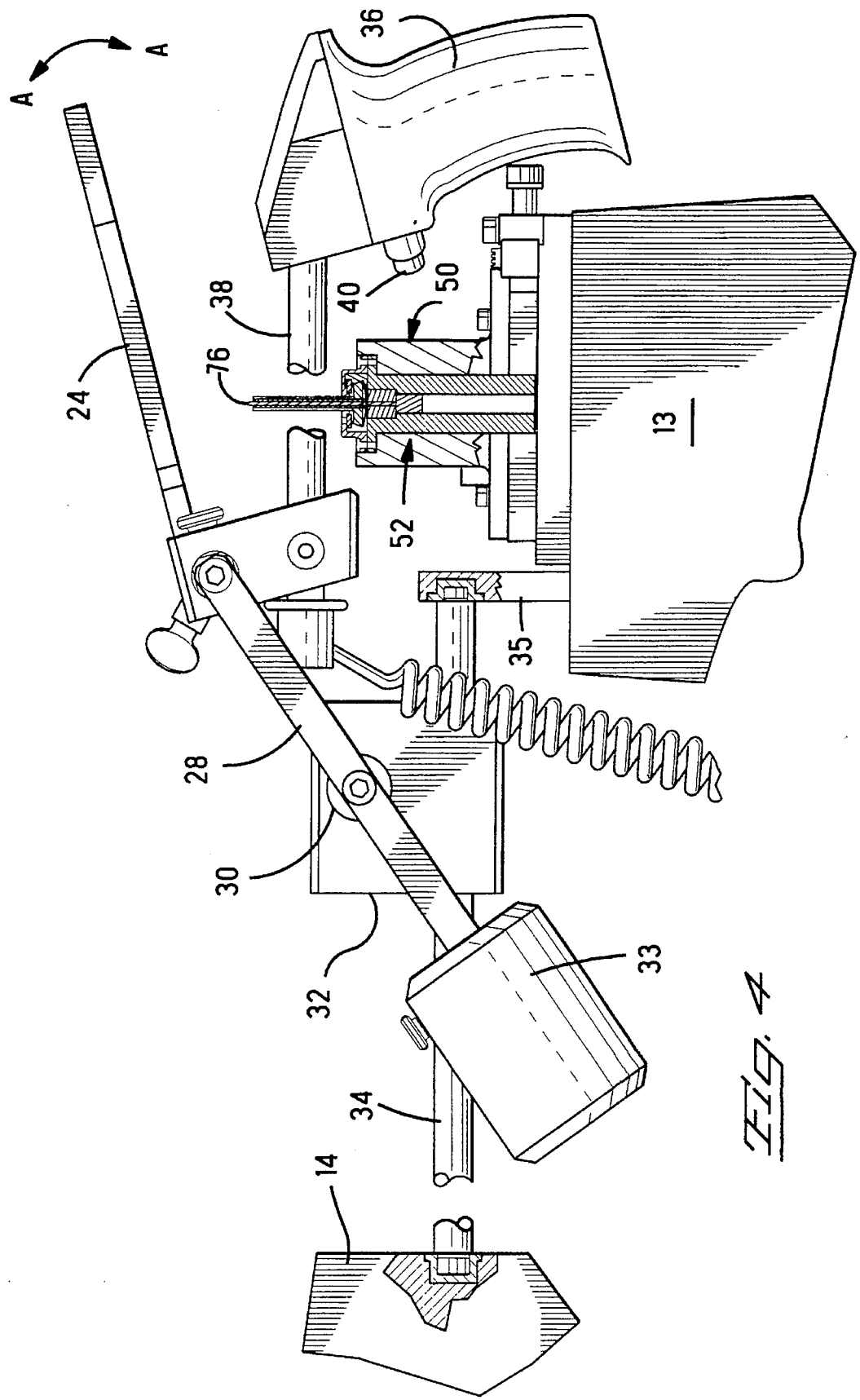
FIG. 4 is a fragmentary side view of a lower portion of the machine.

A pair of handgrips 36 are coupled to the board support bar 22 by respective mounting blocks 37 and extension rods 38. The handgrips enable a circuit board which is fixed between the clamp bars 24 to be selectively positioned with respect to the tooling ram while an operator's hands are remote from the workstation 4. By applying force to the handgrips the operator can move the circuit board in one direction parallel to the board support bar 22, and in another direction parallel to the clamp bars 24, thereby providing freedom of movement in a plane which intersects the tooling ram path. Further, the handgrips enable upward and downward movement of the circuit board by rotating the transverse shaft 30 in the bearing block 32, as indicated by the arrows A—A in FIG. 4. Downward force on the handgrips urges the circuit board downwardly into engagement with an anvil switch 52, which will be fully described hereinbelow, of the lower tooling assembly 50.

Disposed on each of the handgrips 36 is a trigger 40 for a safety trip switch which is disposed within each handgrip. The safety trip switch is normally open and is closed when its respective trigger 40 is depressed. The safety trip switches are wired in an electrical control system for the insertion machine. The control system operates valving and is arranged such that pneumatic pressure is not admitted to the cylinder 16 unless both of the safety trip switches are closed. Since both of the triggers 40 must be depressed in order to close both of the safety trip switches, it is virtually impossible for a machine operator to actuate the ram without having one hand on each of the handgrips 36. The safety trip switches and their attendant triggers provide a means for effecting a first signal upon simultaneous actuation thereof.

Figure 5:
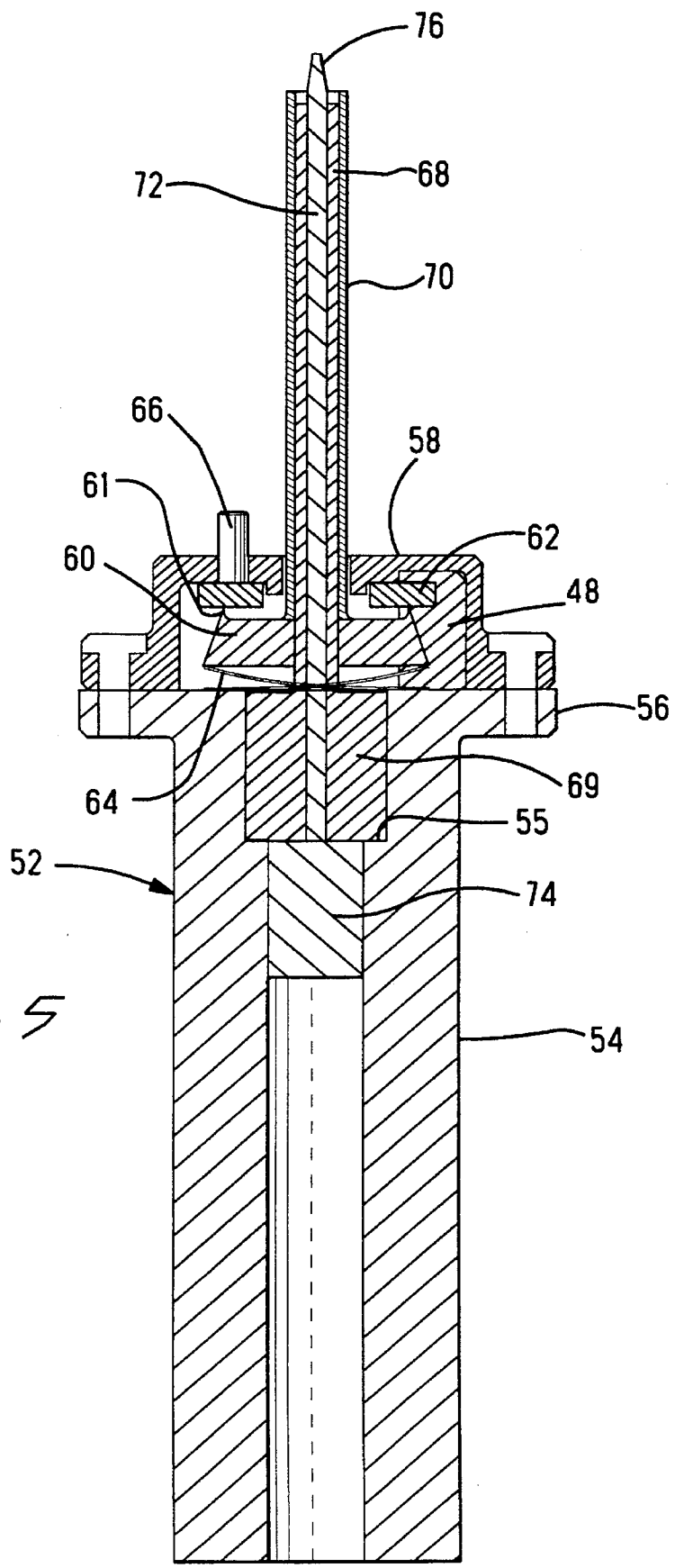
FIG. 5 is a cross-sectional view of an anvil tooling switch used in the safety switch system.

With reference to FIG. 5, anvil switch 52 comprises a switch body 54 which is electrically grounded to the frame of the machine. A top part of the switch body 54 includes an annular flange 56 on which is mounted an electrically insulative cap 58. Housed within the cap 58 is a brass plunger 60 which forms a first contact for the anvil switch 52. The plunger 60 is prevented from rotating in the anvil switch by a rib 48 which is secured in the cap 58 and is loosely received in a slot in the plunger 60. On an underside of the cap 58 is mounted a copper washer 62 which forms a second contact for the anvil switch. The plunger 60 has a sharp ridge 61 which helps to cut through any deposits or corrosion on the washer 62. The plunger 60 is biased into engagement with the washer 62 by a finger spring 64 so that the normally closed switch 52 provides a ground path from a terminal 66 through the washer 62, the plunger 60, the spring 64 and the switch body 54. The terminal 66 is wired in the electrical control system for the insertion machine so that electronics in the control system senses an electrical ground until the anvil switch is physically actuated. The anvil switch 52 comprises a means for effecting a second signal upon actuation thereof.

The anvil switch 52 further includes an anvil 68 having a base 69 which is interference fitted in the anvil body 54 and which is seated on a ledge 55 of the anvil body. A cylindrical sleeve 70 surrounds the anvil 68, both of which extend through a central aperture in the cap 58. The sleeve 70, which is electrically conductive, is soldered to the plunger 60 and is biased upwardly therewith by the spring 64. Normally the sleeve 70 extends approximately 0.020 inch above the anvil 68. The sleeve 70 is an anvil switch trigger which can be actuated by urging the circuit board downwardly thereon to disengage the plunger 60 from the washer 62.

A locator pin 72 is slidable within a central passageway in the anvil 68. The locator pin 72 has a piston 74 at its lower end which is slidably guided within the switch body 54. During intervals between actuation cycles of the ram, the machine control system directs pneumatic pressure to an underside of the piston 74, thereby urging the piston upwardly so that an upper end 76 of the locator pin 72 protrudes beyond an upper end of the sleeve 70. The locator pin 72 provides a means for aligning a selected aperture of the circuit board in position for receiving a terminal therein. When the circuit board 6 is lowered onto the sleeve 70 with the locator pin 72 extending through an individual aperture, as shown in FIG. 6, that aperture is properly aligned for receiving a terminal which is to be driven by the tooling ram 17. It should be noted that the anvil 68, the sleeve 70 and the locator pin 72 are all grounded through the anvil switch body 54, and thus there is no possibility of damaging components on circuit board 6 from shock.

In order to position the circuit board 6 for insertion of a terminal in a selected aperture, an operator uses the handgrips 36 to move the circuit board in a first direction which is non-parallel with the tooling ram path until the selected aperture is disposed in the ram path immediately above the locator pin 72. In order to assist the operator in visually aligning the selected aperture, a beam of light may be directed to a position immediately above the locator pin, thereby highlighting any aperture which enters the light beam and facilitating the alignment of a selected aperture in the beam. The handgrips 36 are then used to move the board in a second direction parallel to the ram path, in this case downwardly, until the locator pin 72 is received in the selected aperture. To further assist the operator in aligning the selected aperture, the counterweights 33 can be adjusted so that the holder biases the circuit board with a slight downward force. With this arrangement the operator can easily drag the circuit board over the locator pin until an aperture becomes aligned therewith, and then the circuit board will drop down lightly as the locator pin enters the aperture until the circuit board rests on the sleeve 70.

In order to trigger the control system to actuate the ram 17, the operator must first depress both of the triggers 40 in the handgrips 36, thereby completing a trip switch circuit which effects a first signal to be sensed by the control system. The operator then uses the handgrips 36 to urge the board 6 downwardly against the sleeve 70 with a sufficient force to compress the spring 64, thereby causing the plunger 60 to disengage from the washer 72, as shown in FIG. 7. This disengagement interrupts the ground path through the anvil switch 54, thereby effecting a second signal to be sensed by the machine control system. When the control system senses a simultaneous occurrence of the first and second signals, i.e., a loss of ground through the anvil switch 54 and closing of both safety trip switches in the hand grips 36, electronics in the control system sends a signal to open a valve which releases pneumatic pressure beneath the piston 74, thereby allowing the locator pin 72 to drop out of the aperture in the board, as shown in FIG. 8. Simultaneously therewith, the control system initiates a machine cycle by directing pneumatic pressure to the actuation cylinder 16, thereby driving the ram 17 downwardly through a ram stroke which will capture a terminal in the feed station 18 and drive the terminal into the selected aperture in the board 6.

The invention provides a safety switch system for a machine wherein a pair of safety trip switches are located on handgrips disposed remote from a work zone, and an anvil switch is disposed in the work zone. The three switches must be actuated simultaneously for at least some time interval in order to cycle the machine. However, if the triggers 40 are depressed continuously, the control system will only cycle the machine if the anvil switch is depressed within five second intervals. If the triggers 40 are depressed for more than five seconds without the anvil switch being depressed, the control system will not cycle the machine until the triggers 40 are released and depressed again. This protects against override of the safety switch system such as by permanently tying down the triggers 40, while permitting a skilled operator to keep the triggers 40 depressed, thereby increasing productivity and avoiding finger and wrist fatigue caused by constant finger motion.

The invention has the advantage that the handgrips are connected to a workpiece holder which is movable so that positional adjustments can be made to the workpiece while the operator's hands remain on the handgrips. Therefore, most hand movements between the handgrips and the workpiece are eliminated, and production rates are significantly increased. Further, the anvil switch is always grounded so that the workpiece is protected from electrical shock.

Although the invention has been described with reference to a particular terminal insertion machine, the invention can be applied to numerous other machines which have a tooling ram movable along a ram path, as should be readily apparent to those skilled in the art.

The invention having been disclosed, a number of variations will now become apparent to those skilled in the art. Whereas the invention is intended to encompass the foregoing preferred embodiments as well as a reasonable range of equivalents, reference should be made to the appended claims rather than the foregoing discussion of examples, in order to assess the scope of the invention in which exclusive rights are claimed.

We claim:

1. In a machine having a tooling ram which is movable along a tooling ram path toward and away from a workstation, and means for driving the tooling ram along the tooling ram path, a safety switch system for triggering actuation of the tooling ram, comprising:

trip switch means including a pair of trip switch triggers disposed remote from the workstation, the trip switch means being operable for effecting a first signal upon simultaneous actuation of the trip switch triggers;

anvil switch means including an anvil switch trigger disposed at the workstation, the anvil switch means being operable for effecting a second signal upon actuation of the anvil switch trigger;

a workpiece holder operably mounted for actuating the anvil switch trigger; and control means for actuating the means for driving so as to move the tooling ram toward the workstation upon sensing the first and second signals.

2. The system according to claim 1, wherein the workpiece holder is mounted for movement in a first direction which is non-parallel with the tooling ram path whereby a target area of the workpiece can be aligned in the tooling ram path in a vicinity of the workstation, and in a second direction parallel to the tooling ram path whereby the workpiece can be urged into actuating engagement with the anvil switch trigger, and further comprising means for moving the holder in the first and second directions.

3. The system according to claim 2, wherein the means for moving includes a pair of handgrips coupled to the holder for effecting manual movement of the holder.

4. The system according to claim 3, wherein the trip switch triggers are disposed on respective ones of the handgrips.

5. The system according to claim 1, wherein the anvil switch means includes a mating pair of contacts arranged in a circuit path, one of the contacts is movable between engaged and disengaged positions with respect to the other of the contacts, the anvil switch trigger is connected for movement with the one contact, and a biasing member is arranged for biasing the one contact to one of the engaged and disengaged positions, such that upon movement of the anvil switch trigger, the one contact is moved to the other of the engaged and disengaged positions, thereby altering the circuit path.

6. The system according to claim 5, wherein the one contact is biased to the engaged position and is electrically grounded, such that movement of the anvil switch trigger moves the one contact against the biasing to the disengaged position, wherein the control means senses a loss of ground at the other contact.

7. The system according to claim 1, wherein the anvil switch means includes an anvil disposed in the tooling ram path, and a locating pin extends from the anvil and is arranged for reception in an aperture in the workpiece.

8. The system according to claim 7, wherein the locating pin is movable within the anvil and is biased outwardly from an end of the anvil in opposition to a direction of the tooling ram along the tooling ram path.

9. The system according to claim 8, wherein the locating pin is biased by pneumatic pressure, and the control means releases the pneumatic pressure upon sensing the first and second signals, thereby permitting retraction of the pin within the anvil.

10. The system according to claim 7, wherein the anvil switch trigger includes a cylindrical sleeve which is movably disposed over the anvil and is biased beyond an end of the anvil in opposition to a direction of the tooling ram along the tooling ram path.

\* \* \* \* \*